US008970861B2

(12) United States Patent
Nikaku

(10) Patent No.: US 8,970,861 B2
(45) Date of Patent: Mar. 3, 2015

(54) DOCUMENT READING METHOD AND APPARATUS WHICH POSITIONS A READ UNIT ACCORDING TO WHETHER A COVER IS OPEN OR CLOSED

(71) Applicant: Daisuke Nikaku, Kanagawa (JP)

(72) Inventor: Daisuke Nikaku, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/970,981

(22) Filed: Aug. 20, 2013

(65) Prior Publication Data

US 2014/0078532 A1 Mar. 20, 2014

(30) Foreign Application Priority Data

Sep. 14, 2012 (JP) ................................. 2012-203674

(51) Int. Cl.
*G06F 3/12* (2006.01)
*H04N 1/401* (2006.01)
*G03G 15/00* (2006.01)
*H04N 1/00* (2006.01)

(52) U.S. Cl.
CPC ............... *H04N 1/401* (2013.01); *G03G 15/00* (2013.01); *H04N 1/00* (2013.01); *G03G 15/60* (2013.01); *G03G 2215/00189* (2013.01); *G03G 2215/0129* (2013.01)
USPC ............. 358/1.13; 355/23; 358/406; 358/461

(58) Field of Classification Search
USPC .......... 355/23; 358/1.13, 1.14, 1.15, 1.2, 296, 358/401, 406, 461, 471, 474, 482, 498
See application file for complete search history.

(56) References Cited

U.S. PATENT DOCUMENTS

| 6,323,933 | B1 * | 11/2001 | Anzai .............................. 355/23 |
| 2003/0081275 | A1 | 5/2003 | Shishido |
| 2005/0052680 | A1 * | 3/2005 | Okamura ...................... 358/1.14 |
| 2006/0023267 | A1 * | 2/2006 | Ikeno et al. .................... 358/474 |
| 2006/0245013 | A1 | 11/2006 | Ikeno et al. |
| 2007/0024923 | A1 * | 2/2007 | Shimizu ........................ 358/471 |
| 2007/0035573 | A1 * | 2/2007 | Hoshi ............................. 347/22 |
| 2007/0216962 | A1 | 9/2007 | Inage |
| 2007/0285739 | A1 | 12/2007 | Nakano et al. |

(Continued)

FOREIGN PATENT DOCUMENTS

| JP | 2003-134307 | 5/2003 |
| JP | 2007-251797 | 9/2007 |

(Continued)

*Primary Examiner* — David S Cammack
(74) *Attorney, Agent, or Firm* — Oblon, Spivak, McClelland, Maier & Neustadt, L.L.P.

(57) ABSTRACT

An image reading device includes a document reading unit configured to guide light emitted from a light source to a photoelectric conversion unit to read an image on the document; a driving unit configured to drive the document reading unit so that the document reading unit reciprocates along the document; a reading position obtaining unit configured to obtain a home position at which the document reading unit is in a stopped state when starting a read operation; a dark time data obtaining unit configured to obtain dark time output data of the photoelectric conversion unit while the light source is turned off; and a read control unit configured to perform control for causing the driving unit to return the document reading unit to the home position and entering a document read operation to read a document image after the dark time data obtaining unit obtains the dark time output data.

8 Claims, 11 Drawing Sheets

(56) References Cited

U.S. PATENT DOCUMENTS

| | | |
|---|---|---|
| 2008/0151331 A1* | 6/2008 | Osakabe .................. 358/498 |
| 2009/0086276 A1* | 4/2009 | Tanaka ..................... 358/401 |
| 2010/0060954 A1 | 3/2010 | Ikeno et al. |
| 2010/0214573 A1* | 8/2010 | Oosaki ..................... 358/1.2 |
| 2011/0026085 A1 | 2/2011 | Tsukahara et al. |
| 2012/0281260 A1 | 11/2012 | Ikeno et al. |
| 2013/0044338 A1 | 2/2013 | Nikaku |

FOREIGN PATENT DOCUMENTS

| | | |
|---|---|---|
| JP | 4363360 | 8/2009 |
| JP | 2009-239929 | 10/2009 |
| JP | 4457976 | 2/2010 |
| JP | 4752605 | 6/2011 |

\* cited by examiner

DOCUMENT READING METHOD AND APPARATUS WHICH POSITIONS A READ UNIT ACCORDING TO WHETHER A COVER IS OPEN OR CLOSED

CROSS-REFERENCE TO RELATED APPLICATION

The present application claims priority to and incorporates by reference the entire contents of Japanese Patent Application No. 2012-203674 filed in Japan on Sep. 14, 2012.

BACKGROUND OF THE INVENTION

1. Field of the Invention

The present invention relates to a document reading device, an image forming apparatus, a document reading method, and a computer-readable storage medium.

2. Description of the Related Art

Conventionally, there has been known an image reading device that includes a box-shaped housing having an opened top surface, a flat contact glass which is attached to the opened top surface of the housing, and a reading unit such as a contact image sensor (hereinbelow, referred to as a CIS) which is reciprocatably provided under the contact glass. In such a flatbed image reading device, a document is placed on the surface of the contact glass so that a surface to be read of the document faces downward, an image on the document is optically read by the CIS, an optical signal of the read image is converted into an electrical signal, and image data is thereby generated.

Recently, there has also been actively developed a sheet through reading device that reads document image data by conveying a document while an image reading unit remains in a stopped state. A sheet through reading device is generally mounted on the above-described flatbed image reading device. When performing flatbed document reading, the sheet through reading device often also serves as a document pressing unit. When an image reading device has a sheet through reading function, a contact glass for sheet through reading is installed in addition to the contact glass for loading a document thereon.

In a general image reading device as described above, a reference stop position of the image reading unit (a CIS, for example) in a standby state is often located under a sheet through reading contact glass. The reason thereof is that, in order to reduce moving operations of the image reading unit as far as possible when document reading is performed by a sheet through method, it is the best way to set the stop position so as to coincide with a sheet through reading position.

When using an image reading device, some users often perform flatbed document reading while a document pressing member (a pressurizing plate or a feeder for sheet thorough reading) is in an open state (for example, when copying a thick literature). In the image reading device having such a configuration, when the document pressing unit is in an open state, ambient light disadvantageously enters the inside of the device through the surface of the contact glass. Ambient light is indoor or outdoor light that enters the inside of the device through an contact glass or an opening of the device.

As described above, in the image reading device in which the reference stop position of the image reading unit coincides with the sheet through reading position, when the document pressing member is in an open state, ambient light directly affects the device.

As a technique for reducing the influence of ambient light, for example, Japanese Patent No. 4457976 discloses a configuration in which a black reference member is disposed to be adjacent to a white reference member for the purpose of reducing variations in black correction data and white correction data caused by ambient light to reduce the influence of ambient light, thereby preventing the deterioration in image quality. However, in Japanese Patent No. 4457976, there are adverse effects such as unavoidable cost increase in the entire device due to the addition of the black reference member and the increase in size of the device. Further, after obtaining black correction data and white correction data at the position near the end of a document, an operation is immediately shifted to a document read operation. However, in this case, it is necessary to control the reading speed with high acceleration so as to reach a predetermined reading speed. In this case, the speed of a reading unit is unstable in the leading end area of the document, and the deterioration in image quality may occur due to uneven speed.

When an image reading unit that uses an image sensor without an optical light-shielding pixel (optical black) is used, generally, upon receiving an instruction to start a document read operation, correction data for black level correction (black shading) is generated and held on the basis of a signal output from the sensor while a light source is in a turned-off state, the black correction data is then subtracted from an output signal obtained from reflected light from a document or a reference white plate, and various corrections are thereafter performed. Normally, upon receiving an instruction for the document read operation, it is preferred to perform control in such a manner that black correction data is first generated and held at the reference stop position while the light source is in a turned-off state, and the image reading unit is then moved to shift an operation to the document reading.

However, in the above conventional technique, when the black correction data generation as described above is performed while the document pressing unit is in an open state, an output signal having a larger output level than that of an actual dark time output signal is disadvantageously obtained due to ambient light as shown in the graph of FIG. 13 illustrating an output level (vertical axis) with respect to a pixel position (horizontal axis). Further, since the way of entrance of ambient light with respect to the image sensor variously changes depending on the installation environment of the image reading device, the amount of incident light is highly likely to change depending on the main scanning position. Normally, when a document having even density in the main scanning direction is read, image data having even density should be output. However, in the above case, different outputs are obtained depending on the main-scanning position. As a result, it is not possible to prevent uneven density and the generation of lines in a final image, and a significant deterioration in image quality thereby disadvantageously occurs.

Therefore, there is a need to prevent the deterioration in image quality even when a document pressing member is in an open state by obtaining dark time output data while the influence of ambient light is minimized.

SUMMARY OF THE INVENTION

It is an object of the present invention to at least partially solve the problems in the conventional technology.

According to an embodiment, an image reading device includes a light source configured to emit light to a document to be read; a document reading unit configured to guide the light emitted from the light source to a photoelectric conversion unit to read an image on the document; a driving unit configured to drive the document reading unit so that the document reading unit reciprocates along the document; a document reading position obtaining unit configured to obtain a home position at which the document reading unit is in a stopped state when starting a read operation; a dark time data obtaining unit configured to obtain dark time output data of the photoelectric conversion unit while the light source is turned off; and a read control unit configured to perform control for causing the driving unit to return the document reading unit to the home position and entering a document read operation to read a document image after the dark time data obtaining unit obtains the dark time output data.

According to another embodiment, an image forming apparatus includes the image reading device according to the above embodiment; and an image forming unit configured to perform image forming based on an image signal of the document, in which the image signal is output from the image reading device.

According to still another embodiment, a document reading method is performed in an image reading device that includes a light source configured to emit light to a document to be read, a document reading unit configured to guide the light emitted from the light source to a photoelectric conversion unit to read an image on the document, and a driving unit configured to drive the document reading unit so that the document reading unit reciprocates along the document. The document reading method includes obtaining a home position at which the document reading unit is in a stopped state when starting a read operation; obtaining dark time output data of the photoelectric conversion unit while the light source is turned off; and performing control for causing the driving unit to return the document reading unit to the home position and entering a document read operation to read a document image after the dark time output data is obtained.

According to still another embodiment, a non-transitory computer-readable storage medium with an executable program stored thereon and executed by a computer in an image reading device that includes a light source configured to emit light to a document to be read, a document reading unit configured to guide the light emitted from the light source to a photoelectric conversion unit to read an image on the document, and a driving unit configured to drive the document reading unit so that the document reading unit reciprocates along the document. The program instructs the computer to perform: obtaining a home position at which the document reading unit is in a stopped state when starting a read operation; obtaining dark time output data of the photoelectric conversion unit while the light source is turned off; and performing control for causing the driving unit to return the document reading unit to the home position and entering a document read operation to read a document image after the dark time output data is obtained.

According to still another embodiment, a non-transitory computer-readable storage medium with an executable program stored thereon and executed by a computer that includes a light source configured to emit light to a document to be read, a document reading unit configured to guide the light emitted from the light source to a photoelectric conversion unit to read an image on the document, and a driving unit configured to drive the document reading unit so that the document reading unit reciprocates along the document. The program instructs the computer to perform: obtaining a home position at which the document reading unit is in a stopped state when starting a read operation; obtaining dark time output data of the photoelectric conversion unit while the light source is turned off; and performing control for causing the driving unit to return the document reading unit to the home position and entering a document read operation to read a document image after the dark time output data is obtained.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinbelow, an embodiment of each of a document reading device, an image forming apparatus, a document reading method, and a program according to the present invention will be described in detail with reference to the accompanying drawings.

Figure 1:
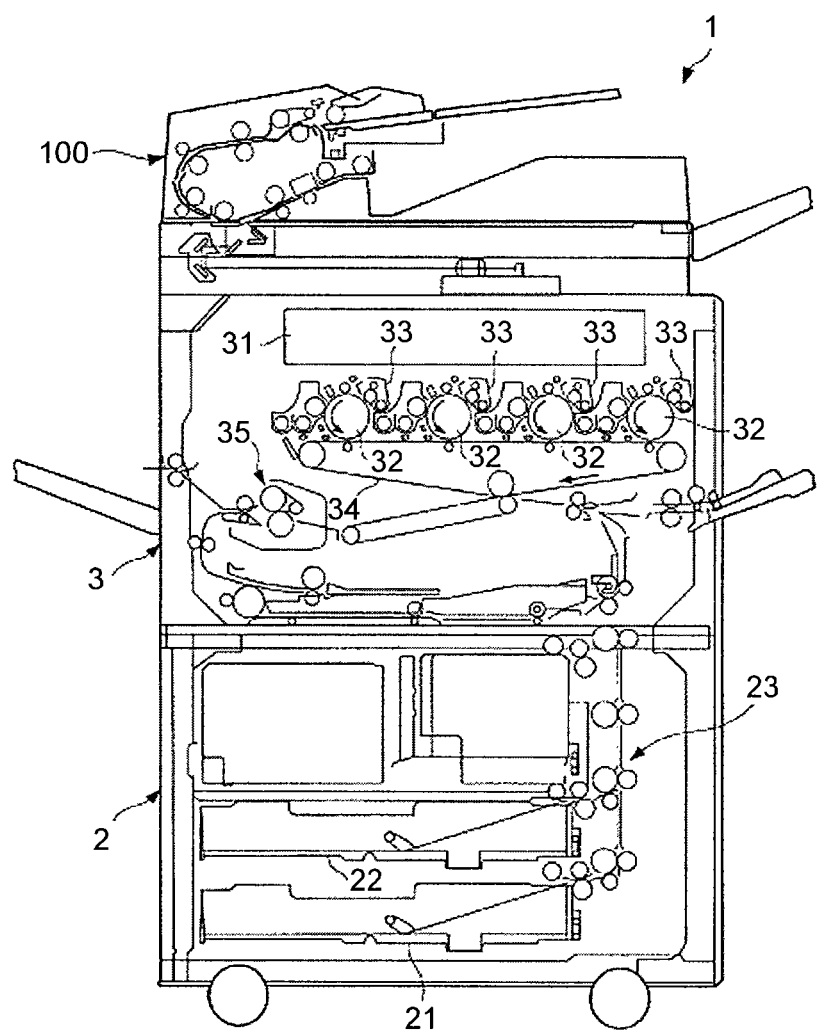
FIG. 1 is an explanatory drawing illustrating the schematic configuration of a copying machine according to an embodiment of the present invention.

FIG. 1 is an explanatory drawing illustrating the schematic configuration of a copying machine 1 according to the embodiment of the present invention. As shown in FIG. 1, the copying machine 1 is provided with an automatic document feeder (ADF) 100 which has a function as an image reading device, a paper feeding unit 2, and an image forming unit 3.

The paper feeding unit 2 includes paper cassettes 21 and 22 in which, respectively, recording sheets of different sizes are stored, and a feeding unit 23 including various rollers which feed a recording sheet stored in the paper cassette 21 or 22 to an image forming position of the image forming unit 3.

The image forming unit 3 is provided with an exposure device 31, photosensitive drums 32, developing units 33, a transfer belt 34, and a fixing unit 35. In the image forming unit 3, on the basis of image data of a document read by an image reading unit provided inside the ADF 100, the photosensitive drums 32 are exposed by the exposure device 31 to form latent images on the photosensitive drums 32, and toners of different colors are supplied to the respective photosensitive drums 32 by the developing units 33 to thereby develop the images. Further, in the image forming unit 3, the images developed on the photosensitive drums 32 are transferred to a recording sheet supplied from the paper feeding unit 2 by the transfer belt 34, and toners of a toner image transferred on the recording sheet are melted to fix a color image on the recording sheet by the fixing unit 35.

Figure 2:
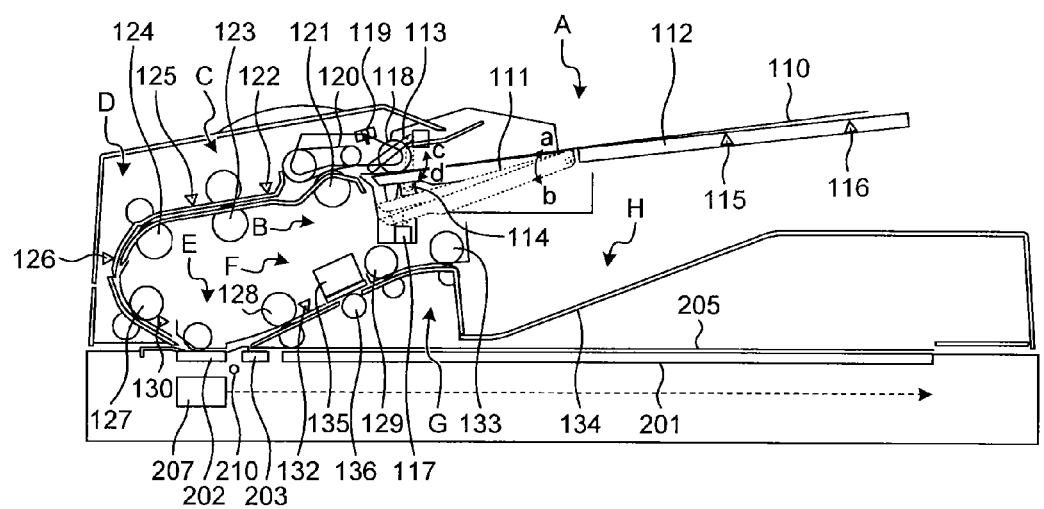
FIG. 2 is an explanatory drawing illustrating the detailed configurations of an ADF and an image reading unit.

FIG. 2 is an explanatory drawing illustrating the detailed configurations of the ADF 100 and the image reading unit. As shown in FIG. 2, the ADF 100 is provided with a document setting unit A on which a bundle of documents is set; a separating/conveying unit B which separates and conveys each document one by one from the document bundle set on the document setting unit A; a registration unit C which performs a primary abutting adjustment of the conveyed document, and then pulls out and feeds the adjusted document; a turn unit D which turns the fed document and feeds the turned document with the surface to be read thereof facing the CIS 207 performing image reading (i.e., facing downward in the drawing); a first reading/feeding unit E which reads an image on the front surface of the document sheet from the underneath of the contact glass 201 by the CIS 207; a second reading/feeding unit F which reads an image on the back surface of the document by a CIS 135 after reading the image on the front surface thereof; a document discharging unit G which discharges to the outside of the device the document for which the images on both of the front and back surfaces have been read to the outside of the device; and a stack unit H which loads and holds the discharged document thereon.

A document bundle 110 to be read is set on the document setting unit A. The document bundle 110 is set on a document table 112 which includes a movable document table 111. The document bundle 110 is set on the document table 112 with the surfaces to be read of the documents facing upward. At this point, the width direction of the document bundle 110 is positioned in the direction perpendicular to the feeding direction thereof by a side guide (not shown). Further, the setting of the document bundle 110 is detected by a set feeler 113 and a set sensor 114, and information indicating that the document bundle 110 has been set is transmitted from a controller 600 (see FIG. 6) to a main control unit 500 (see FIG. 5) via an I/F circuit 507 (see FIG. 5).

Further, the approximate length of the document bundle 110 in the feeding direction is determined by document length detection sensors 115 and 116 both of which are provided on the surface of the document table. As each of the document length detection sensors 115 and 116, for example, a reflective sensor or an actuator-type sensor that can detect even a single document is used. Further, it is necessary to arrange the respective document length detection sensors 115 and 116 so that at least the length or width of the documents of the uniform size can be detected.

The movable document table 111 is configured to be movable in upward and downward directions respectively indicated by a and b in FIG. 2 by a bottom plate raising motor (not shown). When the document bundle 110 is not set on the document table 112, the movable document table 111 is in a moved-down state. This state is detected by a bottom plate HP sensor 117. When the set feeler 113 and the set sensor 114 detect that the document bundle 110 has been set on the document table 112, the controller 600 (see FIG. 6) causes the bottom plate raising motor (not shown) to rotate in the forward direction to thereby raise the movable document table 111 so that the top surface of the document bundle 110 comes into contact with a pick-up roller 118 of the separating/conveying unit B. The pick-up roller 118 operates in the directions indicated by c and d in FIG. 2 by a pick-up motor (not shown) via the action of a cam mechanism. In addition, the pick-up roller 118 is raised in the c direction in FIG. 2 by being pushed by the top surface of the document bundle 110 on the movable document table 111 when the movable document table 111 moves up, so that an appropriate feeding position sensor 119 can detect the upper limit of the position of the pick-up motor 18.

When a print key of an operating unit (not shown) is depressed by a user, and a document feeding signal is thereby transmitted from the main control unit 500 (see FIG. 5) to the controller 600 via the I/F circuit 507, the pick-up roller 118 is driven to rotate by the forward rotation of a document feeding motor (not shown), and picks up several documents (desirably, a single document) on the document table 112. The direction of the rotation of the pick-up roller 118 is the direction for feeding the uppermost document in the document bundle 110 to a document feeding port.

A paper feeding belt 120 is driven in the feeding direction by the forward rotation of the document feeding motor (not shown). On the other hand, a reverse roller 121 is driven to rotate in the direction opposite to the feeding direction by the forward rotation of the document feeding motor (not shown). Accordingly, the uppermost document can be separated from the other documents located underneath thereof so that only the uppermost document can be fed. More specifically, the reverse roller 121 makes contact with the paper feeding belt 120 at a predetermined pressure. When the reverse roller 121 is in contact with the paper feeding belt 120 directly or with a single document interposed therebetween, the reverse roller 121 rotates in the counterclockwise direction along with the rotation of the paper feeding belt 120. On the other hand, the reverse roller 121 is set in such a manner that, when two or more documents enter a gap between the paper feeding belt 120 and the reverse roller 121, a torque caused by the co-rotation force becomes weaker than the torque of a torque limiter. Accordingly, the reverse roller 121 rotates in the clockwise direction, namely, in the original driving direction, and thereby functions to push back an excessive document. As a result, it is possible to prevent a plurality of documents from being fed together.

The single document separated by the action between the paper feeding belt 120 and the reverse roller 121 is conveyed toward the registration unit C via the paper feeding belt 120, and the leading end of the document is then detected by the abutting sensor 122. After that, the document further advances and comes into contact with pullout rollers 123. The document is then conveyed by a predetermined distance after being detected by the abutting sensor 122. Then, by stopping the sheet feeding motor (not shown) while the document is pressed against the pullout rollers 123 with a predetermined amount of deflection, the driving of the paper feeding belt 120 is stopped. At this point, by rotating the pick-up motor (not shown), the pick-up roller 118 is caused to withdraw from the top surface of the document. Accordingly, the document is conveyed only by the conveying force of the paper feeding belt 120, and the leading end of the document enters a nip between a pair of upper and lower rollers constituting the pullout rollers 123. As a result, the leading end is adjusted (skew correction).

The pullout rollers 123 have the skew correction function, and are used for feeding a document that has been separated and then skew-corrected to intermediate rollers 124. The pullout rollers 123 are driven by the reverse rotation of the document feeding motor (not shown). When the document feeding motor (not shown) rotates in the reverse direction, although the pullout rollers 123 and the intermediate rollers 124 are driven, the pick-up roller 118 and the paper feeding belt 120 are not driven.

A plurality of document width sensors 125 are arranged in the depth direction of FIG. 2, and detect the size of the document fed by the pullout rollers 123 in the width direction that is perpendicular to the feeding direction thereof. The length of the document in the feeding direction is detected, on the basis of motor pulses, by sensing the leading end and the trailing end of the document by using the abutting sensor 122.

When the document is fed from the registration unit C to the turn unit D by driving the pullout rollers 123 and the intermediate rollers 124, the feeding speed in the registration unit C is set to be higher than the feeding speed in the first reading/feeding unit E to shorten the processing time for sending the document to the image reading unit. When the leading end of the document is detected by a reading entrance sensor 126, before the leading end of the document enters a nip between a pair of upper and lower reading entrance rollers 127, the document feeding speed starts being reduced to be equal to the reading feeding speed, and at the same time, a reading motor (not shown) is driven to rotate in the forward direction to thereby drive the reading entrance rollers 127, reading exit rollers 128, and CIS exit rollers 129. When the leading end of the document is detected by a registration sensor 130, the feeding speed of the document is reduced within a predetermined feeding distance to be temporarily stopped in front of the CIS 207, and a registration stop signal is transmitted to the main control unit 500 (see FIG. 5) via the I/F circuit 507 (see FIG. 5).

Thereafter, when a read start signal is transmitted from the main control unit 500 (see FIG. 5) to the controller 600 (see FIG. 6) via the I/F circuit 507, the controller 600 (see FIG. 6) causes the document that has been stopped for registration to be fed by accelerating the document so that the feeding speed thereof reaches a predetermined feeding speed before the leading end of the document arrives at the position where the CIS 207 is arranged. At this point, the position of the leading end of the document is detected by the pulse counting of the reading motor (not shown). At the timing when the leading end of the document reaches the CIS 207, gate signals indicating an effective image area of the front surface of the document in the sub-scanning direction (i.e., the direction that is the same as the feeding direction of the document) are transmitted to the CIS 207. The gate signals are continuously transmitted until the trailing end of the document passes through the CIS 207. While the document is fed by driving the reading entrance rollers 127 and the reading exit rollers 128, an image on the front surface of the document is read by the CIS 207.

When reading a single-sided original, after an image on the front surface of the document is read by the CIS 207 of the first reading/feeding unit E, the document passes through the second reading/feeding unit F, and is fed to the document discharging unit G. In this case, when a document discharging sensor 132 detects the leading end of the document, the controller 600 (see FIG. 6) drives a document discharging motor (not shown) to rotate in the forward direction to thereby rotate a pair of upper and lower document discharging rollers 133 in the counterclockwise direction. In addition, according to the pulse counting by the document discharging motor (not shown) counted since the leading end of the document is detected by the document discharging sensor 132, the controller 600 (see FIG. 6) reduces the driving speed of the document discharging motor immediately before the trailing end of the document comes out of a nip between the pair of upper and lower document discharging rollers 133 so as to prevent the document to be discharged onto a discharge tray 134 of the stack unit H from falling out of the device.

Figure 3:
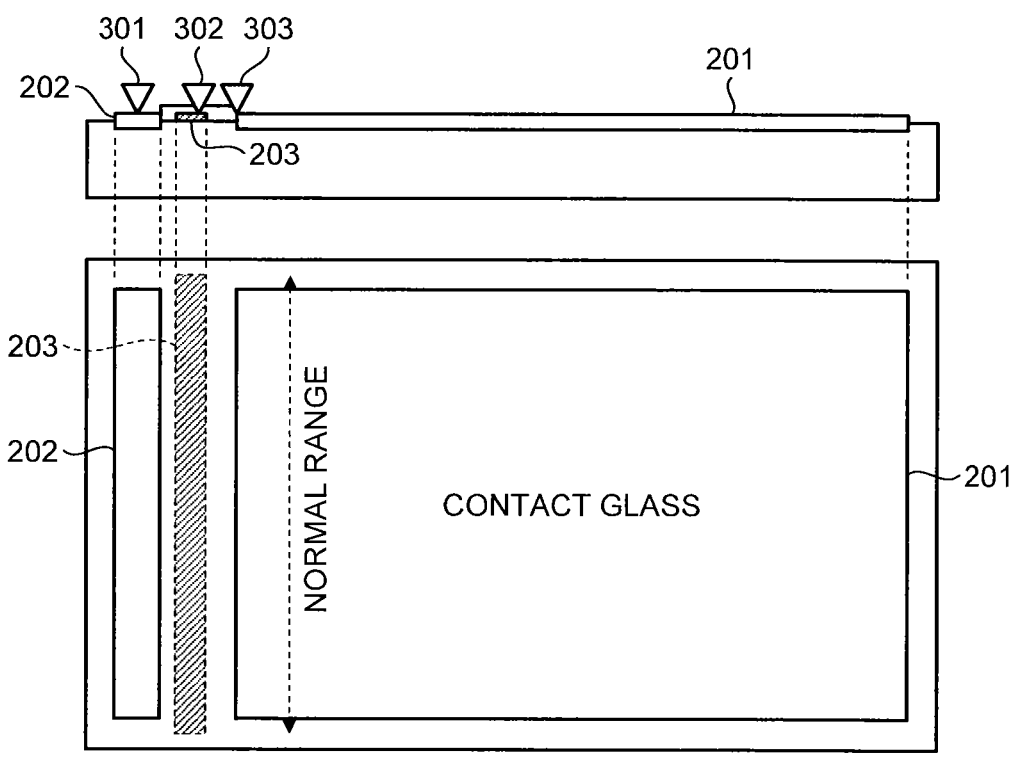
FIG. 3 is an explanatory drawing illustrating the relationship between a stop position of the image reading unit (optical scanning unit) and the surroundings thereof.

FIG. 3 is an explanatory drawing illustrating the relationship between a stop position of the image reading unit (optical scanning unit) and the surroundings thereof. As shown in FIG. 3, a first stop position 301 which is a home position of the CIS 207 is located under the sheet through reading contact glass 201 at substantially the center with respect to the sub-scanning width of the contact glass 201. A second stop position 302 at which black correction data is generated when the document pressing unit is in an open state is a black correction data generation position. The second stop position 302 is located under a reference white plate attachment member which is provided with a reference white plate 203 at substantially the center with respect to the sub-scanning width of the reference white plate attachment member. Further, reference numeral 303 denotes a read start position.

Figure 4:
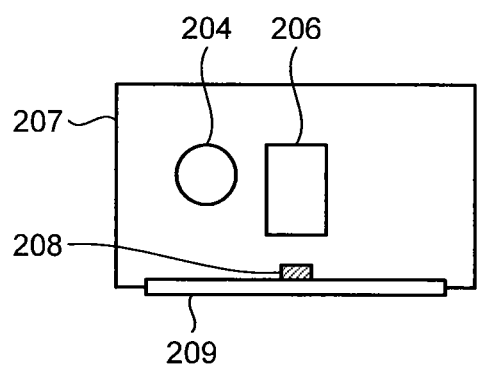
FIG. 4 is an explanatory drawing illustrating an example of the configuration of a CIS.

FIG. 4 is an explanatory drawing illustrating an example of the configuration of the CIS 207. The CIS 207 is provided with a light source 204 which directs light to a document, an image reading circuit 209 which is equipped with an image sensor 208, and a lens unit 206 for imaging light reflected by the document on the image sensor 208. A CCD or CMOS sensor is used as the image sensor. The light source 204 may be a white light source, or may also be a light source using a method in which three RGB colors of light sources are switched to be sequentially turned on.

In the above configuration, when a document 205 is placed on the contact glass 201, it is possible to select a method in which the light source 204 is turned on, and the document 205 is scanned by moving the CIS 207 rightward by rotating the driving motor according to a motor driving signal from the controller 600 to thereby read image information of the document 205, or a method in which the light source 204 is turned on while the CIS 207 remains in a stopped state to direct light to the document 205 which is being fed by the ADF 100 through the sheet through reading contact glass 202 to thereby read image information of the document 205.

When the document is scanned by moving the CIS 207, data of the reference white plate is obtained to generate shading correction data, and the generated shading correction data is stored in a memory prior to the scanning of the document. Then, the image data of the document 205 is normalized by using the shading correction data to thereby correct uneven light amount distribution and uneven sensitivity of the CCD in the device. In this manner, the image information of the document is read with high quality.

Figure 5:
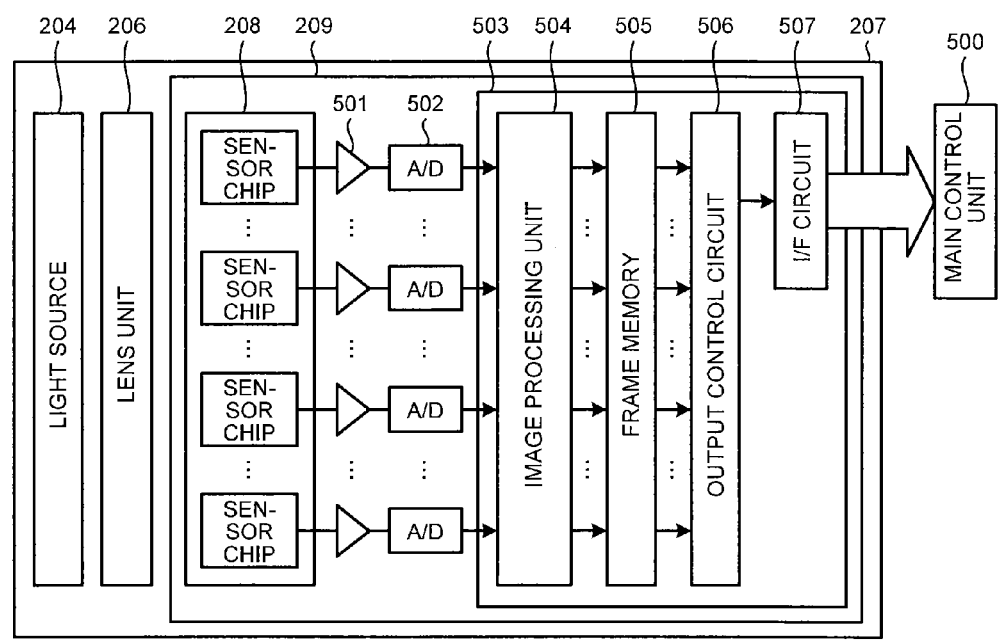
FIG. 5 is an explanatory drawing illustrating a relevant portion of an electric circuit in the CIS.

FIG. 5 is an explanatory drawing illustrating a relevant portion of an electric circuit in the CIS 207. As shown in FIG. 5, the CIS 207 is provided with the light source 204 which is composed of a light emitting diode (LED) array or the like, the image sensor 208 which includes a group of sensor chips and serves as a photoelectric conversion unit which converts an optical signal into an electrical signal, a plurality of amplifier circuits 501 which are individually connected to the respective sensor chips in the sensor chip group, and a plurality of A/D converters 502 which are connected to the respective amplifier circuits 501. The CIS 207 is further provided with an image processing unit 504 which generates image data of the document read by the image sensor 208, a frame memory 505 which holds the image data generated by the image processing unit 504 for each frame, an output control circuit 506 which controls the output of image data, and the I/F circuit 507.

Each piece of digital data output from each of the A/D converters is input to the image processing unit 504. In the image processing unit 504, the input piece of digital data is subjected to black correction (black shading correction), white shading correction and the like, and then temporarily stored in the frame memory 505 as document image data. Thereafter, the document image data stored in the frame memory 505 is converted into a data format that can be accepted by the main control unit 500 by the output control circuit 506, and then output to the main control unit 500 via the I/F circuit 507. This configuration is just an example. For example, it is also possible to have a system configuration that includes a digital signal processing unit 503 provided in the main control unit 500.

Figure 6:
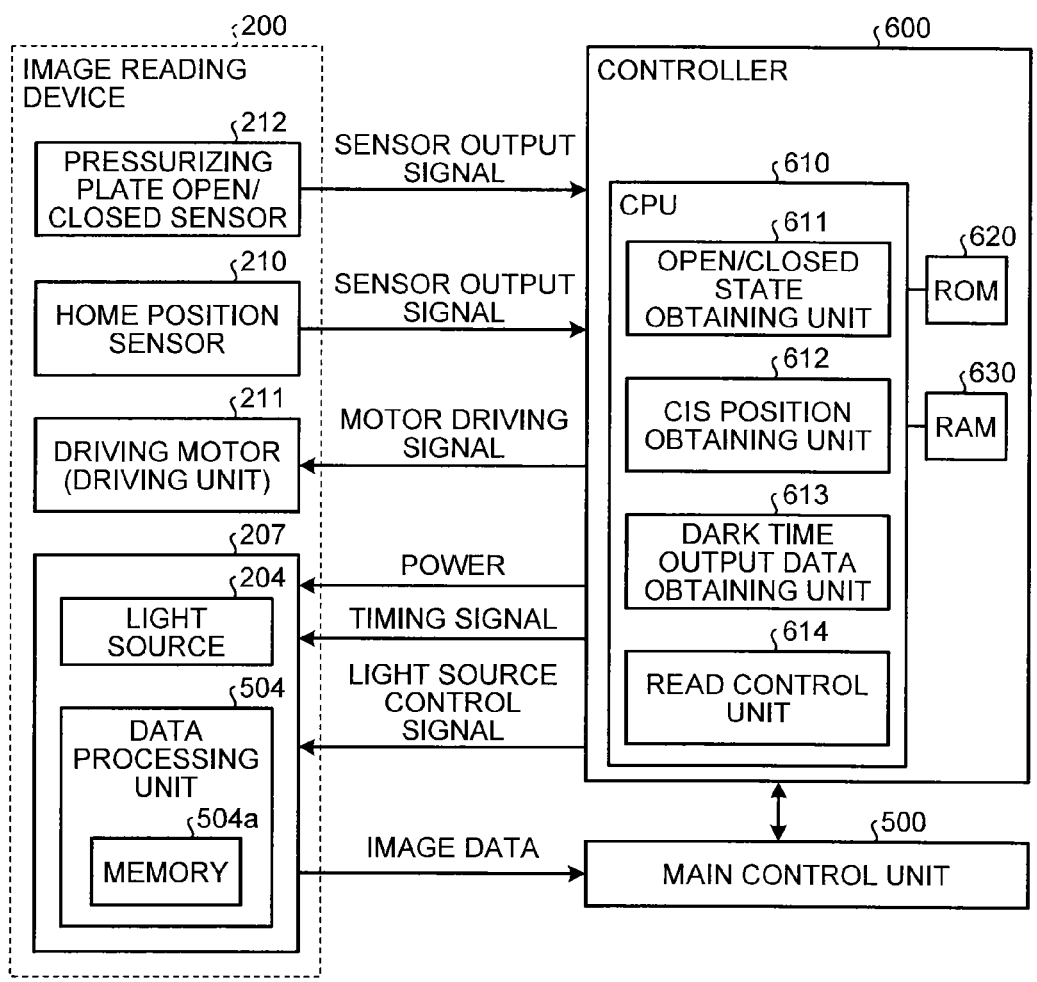
FIG. 6 is a block diagram illustrating the configurations of an image reading device and peripheral units thereof.

FIG. 6 is a block diagram illustrating the configurations of the image reading device 200 and peripheral units thereof. In FIG. 6, the controller 600 includes a microcomputer system that has a CPU 610, a ROM 620, and a RAM 630. The CPU 610 is provided with functions including an open/closed state obtaining unit 611, a dark time output data obtaining unit 613, and a read control unit 614. A driving motor 211 as a driving unit is driven by a motor driving signal from the controller 600.

Figure 8:
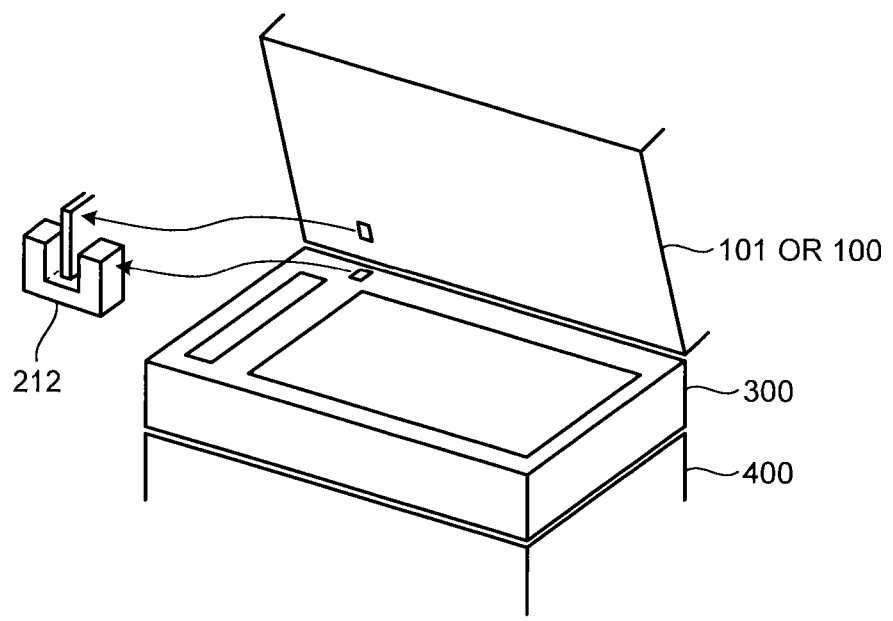
FIG. 8 is an explanatory drawing illustrating a schematic view of an image forming apparatus that includes the image reading device.

The open/closed state obtaining unit 611 obtains an open/closed state of the ADF 100 as the document pressing member or the document pressurizing plate from the contact glass 201 by a pressurizing plate open/closed sensor 212 (see FIG. 8). A CIS position obtaining unit 612 obtains the position of the CIS 207 on the basis of information detected by a home position sensor 210. The dark time output data obtaining unit 613 obtains dark time output data of the image sensor 208 of the CIS 207 while the light source 204 is in a turned-off state from the stop position as the home position (the first stop position 301, see FIG. 3). After obtaining the dark time output data by the dark time output data obtaining unit 613, the read control unit 614 performs control for causing the CIS 207 to return to the home position, and shifting the operation to a document read operation to read the document image.

Figure 7:
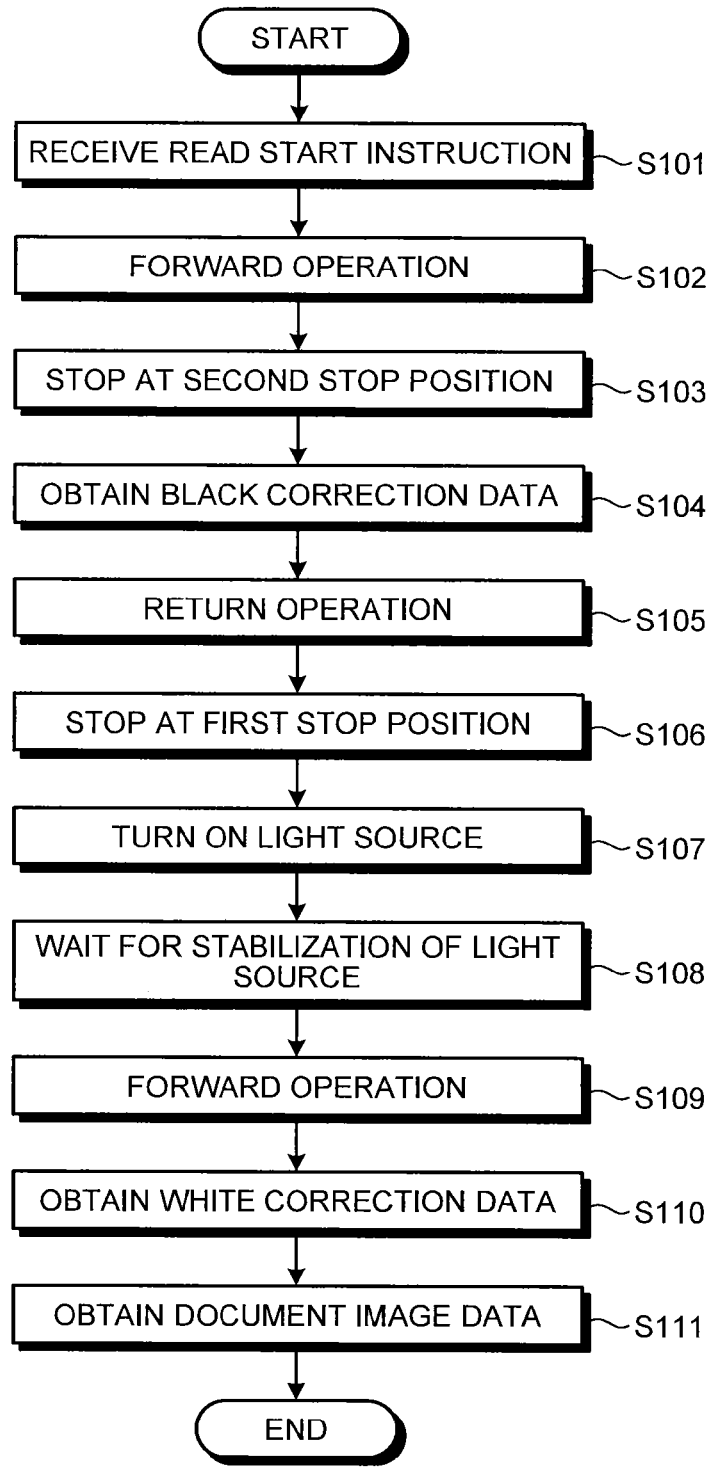
FIG. 7 is a flow chart illustrating a control operation example (1) of an image reading device according to the embodiment.

FIG. 7 is a flow chart illustrating a control operation example (1) of the image reading device according to the embodiment. The control operation is executed by the controller 600 which has the CPU 610, the ROM 620, and the RAM 630 as shown in FIG. 6. First, when the controller 600 receives a read start instruction from a user (step S101), the driving motor 211 is controlled by a motor driving signal from the controller 600 to cause the CIS 207 to move in the forward direction (step S102) and then stop in the second stop position 302 (step S103). The second stop position 302 is preferably located near the underneath of the reference white plate fixing member, for example, as shown in FIG. 3 so as to be the least influenced by ambient light through the sheet through reading glass 202 or the contact glass 201 for loading a document thereon. The detailed position can be determined by an evaluation result in the design stage, and is therefore not limited to the position described in the present embodiment.

Next, the dark time output data obtaining unit 613 obtains dark time output data that is output from the image sensor 208 while the light source 204 of the CIS 207 is in a turned-off state at the second stop position 302, and the obtained dark time output data is held as black correction data in a memory 504a inside the image processing unit 504 (step S104). A value to be held as the black correction data is preferably an average value of a plurality of lines taking the influence of a noise component into consideration. Further, in the case of an image sensor such as a CMOS sensor in which dark time outputs are different from each other in respective pixels, it is preferred to hold an average value of a plurality of lines for each pixel.

Next, after obtaining the black correction data, the read control unit 614 controls the driving motor 211 by a motor driving signal from the controller 600 to cause the CIS 207 to temporarily return to the first stop position 301 (step S105), and stop at the first stop position 301 (step S106). Then, the light source 204 of the CIS 207 is turned on by the control of a light source control signal from the controller 600 (step S107). After waiting for the stabilization of the amount of light from the light source 204 (step S108), the forward operation of the CIS 207 is again started (step S109), white correction data is obtained when the CIS 207 passes under the reference white plate (step S110), and the operation is shifted to obtaining document image data (step S111).

Although not illustrated in FIG. 7, after obtaining the document image data, the light source 204 is turned off, and the CIS 207 is stopped. Then, the CIS 207 returns to the first stop position 301 by the return operation, and the read operation is thereby finished. Then, the CIS 207 is shifted to a standby state for next document reading.

FIG. 8 is an explanatory drawing illustrating a schematic view of an image forming apparatus that includes the image reading device. As shown in FIG. 8, the pressurizing plate open/closed sensor 212 is provided in the image reading device (scanner) 300 shown in FIG. 2 at the far side thereof, the image reading device 300 being placed on a main body 400. As the pressurizing plate open/closed sensor 212, a commonly-used photointerrupter (transmission-type photo sensor) is used. Further, in the document pressing unit, a simple mechanism for blocking light between a light emitting element and a light receiving element of the photointerrupter is provided at the position facing the pressurizing plate open/closed sensor 212 so that light can be blocked when the document pressing unit is closed.

Due to the above configuration, the output signal logic of the pressurizing plate open/closed sensor 212 is changed between when the document pressing unit is in an open state and when in a closed state. Therefore, the controller 600 can recognize the state of the document pressing unit by detecting the signal logic of the pressurizing plate open/closed sensor 212. The document pressing unit may be the pressurizing plate 101 or may also be the ADF 100.

Figure 9:
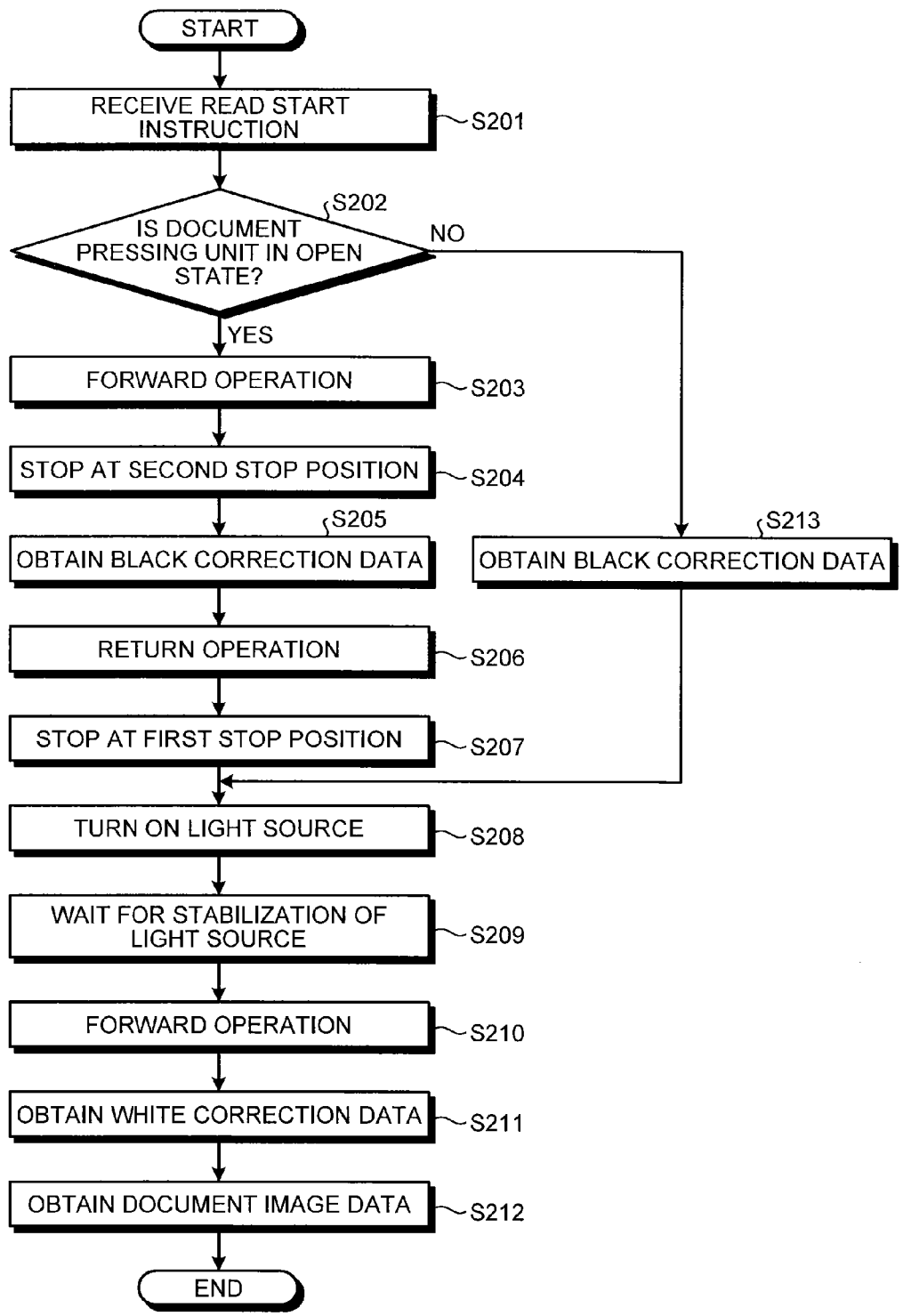
FIG. 9 is a flow chart illustrating a control operation example (2) of the image reading device according to the embodiment.

FIG. 9 is a flow chart illustrating a control operation example (2) of the image reading device according to the embodiment. The control operation is executed by the controller 600 which has the CPU 610, the ROM 620, and the RAM 630 as shown in FIG. 6. First, when the controller 600 receives a read start instruction from a user (step S201), the open/closed state obtaining unit 611 detects the output signal logic of the pressurizing plate open/closed sensor 212 to thereby determine whether or not the document pressing unit (see FIG. 8) is in an open state (step S202). When the document pressing unit is determined to be in a closed state (NO in step S202), the moving operation of the CIS 207 is not performed. Alternatively, dark time output data that is output from the image sensor 208 while the light source 204 of the CIS 207 is in a turned-off state is obtained in the image processing unit 504, and the obtained dark time output data is held as black correction data in the memory 504a inside the image processing unit 504 (step S213).

Then, the light source 204 of the CIS 207 is turned on by the control of a light source control signal from the controller 600 (step S208). After waiting for the stabilization of the amount of light from the light source 204 (step S209), the forward operation of the CIS 207 is again started (step S210), white correction data is obtained when the CIS 207 passes under the reference white plate 203 (step S211), and the operation is shifted to obtaining document image data (step S212).

On the other hand, when the document pressing unit is determined to be in an open state (YES in step S202), a read operation is performed in the same order as that shown in the flow chart of FIG. 7 (steps from S203 to S212).

Figure 10:
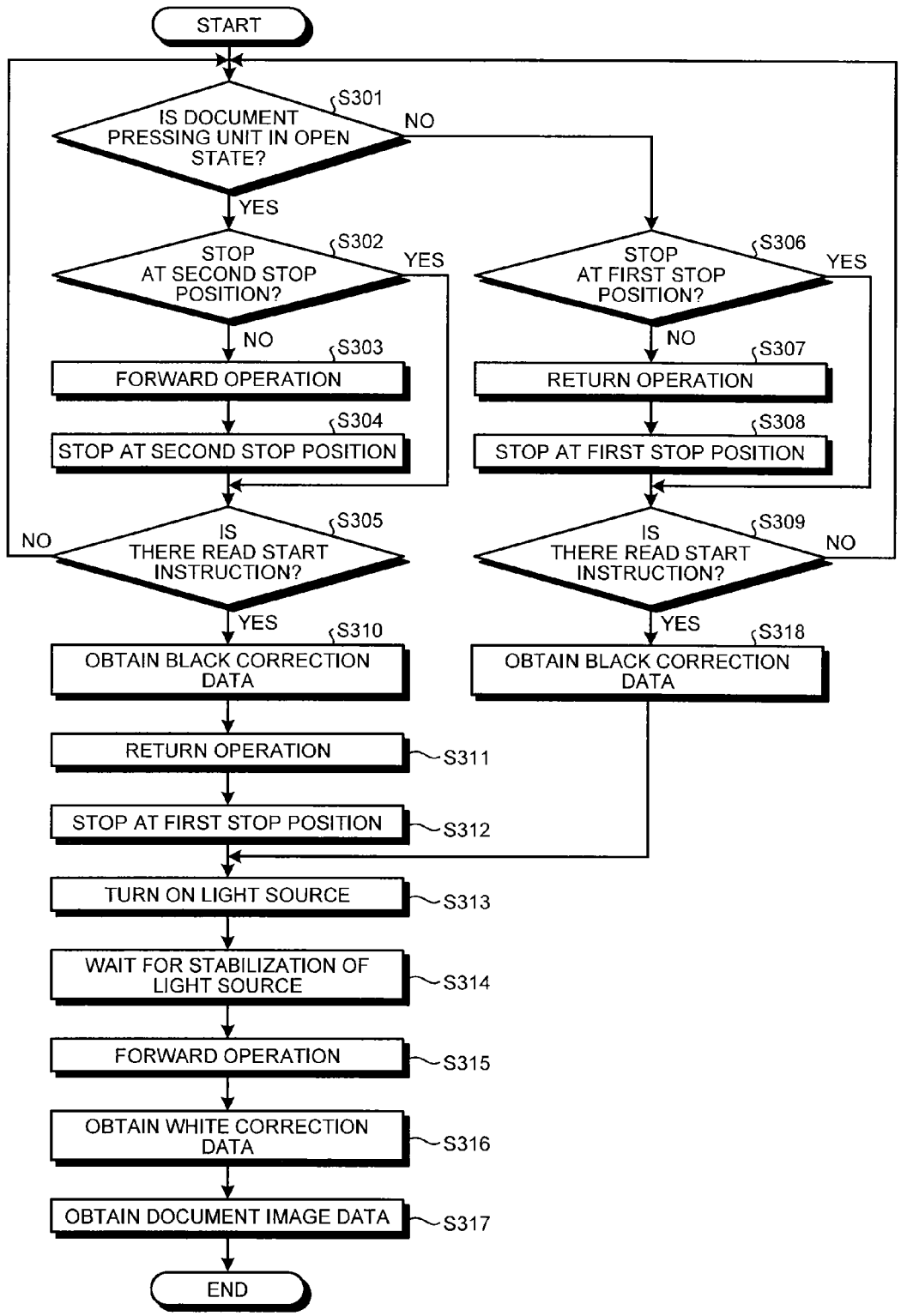
FIG. 10 is a flow chart illustrating a control operation example (3) of the image reading device according to the embodiment.

FIG. 10 is a flow chart illustrating a control operation example (3) of the image reading device according to the embodiment. The control operation is executed by the controller 600 which has the CPU 610, the ROM 620, and the RAM 630 as shown in FIG. 6. First, in a standby state, the open/closed state obtaining unit 611 constantly monitors the output signal logic of the pressurizing plate open/closed sensor 212 to thereby determine whether or not the document pressing unit is in an open state (step S301). Hereinbelow, a case where the document pressing unit (see FIG. 8) is determined to be in an open state by the open/closed state obtaining unit 611 (YES in step S301) and a case where the document pressing unit is determined to be in a closed state by the open/closed state obtaining unit 611 (NO in step S301) will be separately described.

(1) Open State

Whether or not the CIS 207 is in a stopped state at the second stop position 302 is detected to thereby determine whether or not the CIS 207 is in a stopped state at the second stop position 302 (step S302). When the CIS 207 is in a stopped state not at the second stop position 302, that is, when the CIS 207 is in a standby state at the first stop position 301 (NO in step S302), the CIS 207 is caused to perform a forward operation (step S303). Then, the CIS 207 is stopped (put on standby) at the second stop position 302 (step S304), and the controller 600 waits for a read start instruction from a user (step S305). That is, when the CIS 207 is in a standby state at the second stop position 302, the controller 600 waits for a read start instruction from a user while maintaining the standby state of the CIS 207.

When a read start instruction from a user is notified (YES in step S305), a read operation is performed in the same order as that shown in the flow of FIG. 7 (steps from S310 to S317). On the other hand, when a read start instruction from a user is not notified (NO in step S305), the operation returns to step S301.

(2) Closed State

Whether or not the CIS 207 is in a stopped state at the first stop position 301 is detected to thereby determine whether or not the CIS 207 is in a stopped state at the first stop position 301 (step S306). When the CIS 207 is in a stopped state not at the first stop position 301, that is, when the CIS 207 is in a standby state at the second stop position 302 (NO in step S306), the CIS 207 is caused to perform a return operation (step S307). Then, the CIS 207 is stopped (put on standby) at the first stop position 301 (step S308), and the controller 600 waits for a read start instruction from a user (step S309). That is, when the CIS 207 is in a standby state at the first stop position 301, the controller 600 waits for a read start instruction from a user while maintaining the standby state of the CIS 207.

When it is determined in step S309 that the read start instruction from a user has been notified (YES in step S309), black correction data is obtained at the first stop position 301 (step S318). Thereafter, the read operation in steps from S313 to S317 is performed in the same manner as described in the above (1). Further, when the CIS 207 is determined to be in a stopped state at the first stop position 301 in step S306 (YES in step S306), the operation is shifted to step S309. When no read start instruction is notified in step S309 (NO in step S309), the operation returns to step S301, and the operations following step S301 are repeatedly performed.

Figure 11:
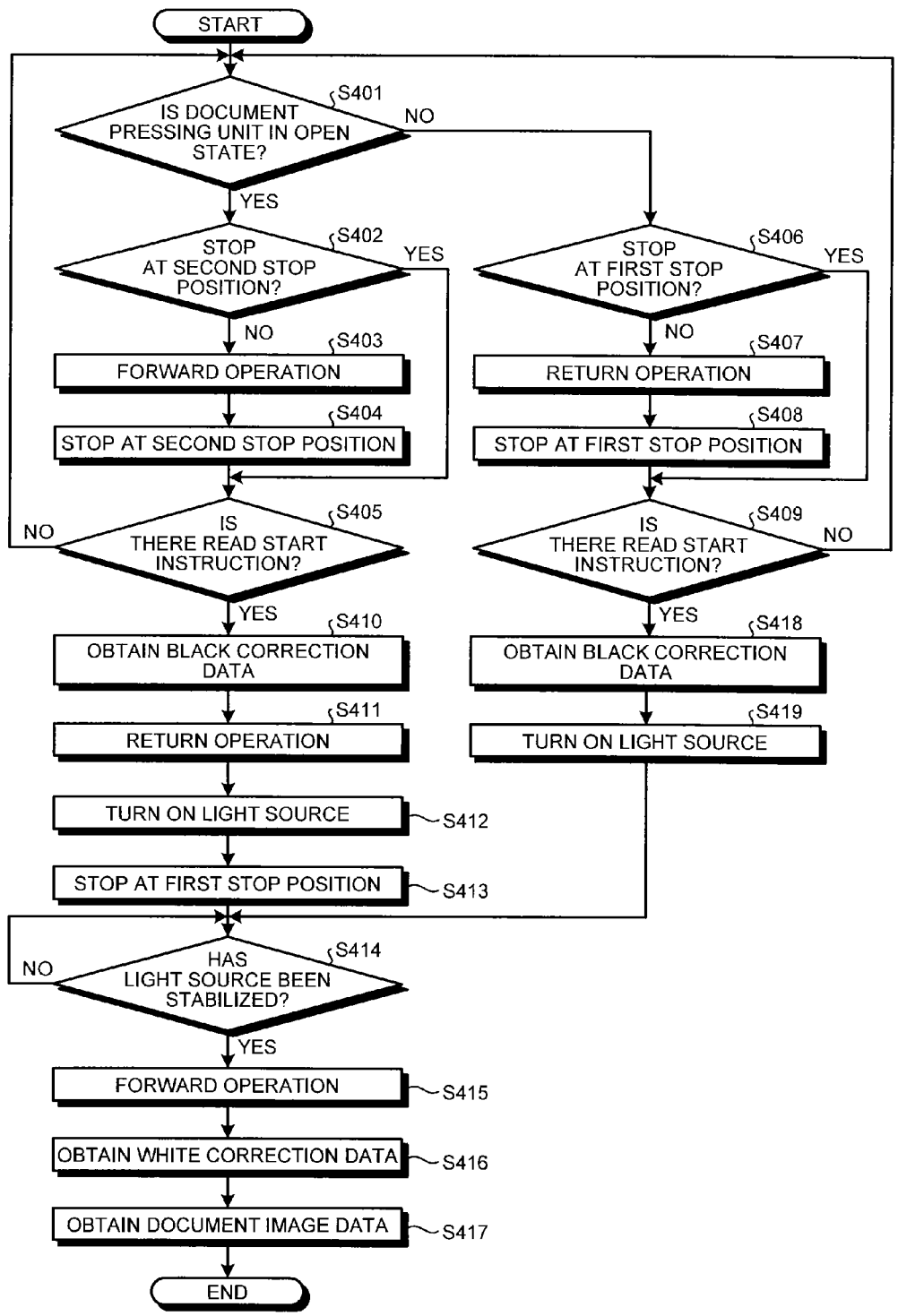
FIG. 11 is a flow chart illustrating a control operation example (4) of the image reading device according to the embodiment.

FIG. 11 is a flow chart illustrating a control operation example (4) of the image reading device according to the embodiment. The control operation is executed by the controller 600 which has the CPU 610, the ROM 620, and the RAM 630 as shown in FIG. 6. In FIG. 11, the flow chart shown in FIG. 10 is partially modified in the read operation when the document pressing unit is in an open state.

Specifically, as shown in FIG. 11, the same control operation as described above is performed to thereby obtain black correction data (step S410). Then, the operation is shifted to a return operation (step S411), and the light source 204 of the CIS 207 is turned on (step S412). Then, the CIS 207 is stopped at the first stop position 301 (step S413), and whether or not the amount of light from the light source 204 has been stabilized is determined (step S414). When the amount of light from the light source 204 is determined to have been stabilized (YES in step S414), the forward operation (step S415), the obtaining of the white correction data (step S416), and the obtaining of the document image data (step S417) are sequentially performed as described above. After obtaining the black correction data in step S418, the light source 204 is turned on (step S419), and the operation is shifted to step S414. Further, when the amount of light from the light source 204 is determined not to have been stabilized in step S414 (NO in step S414), the CIS 207 remains in a standby state until the amount of light from the light source 204 is stabilized.

Figure 12:
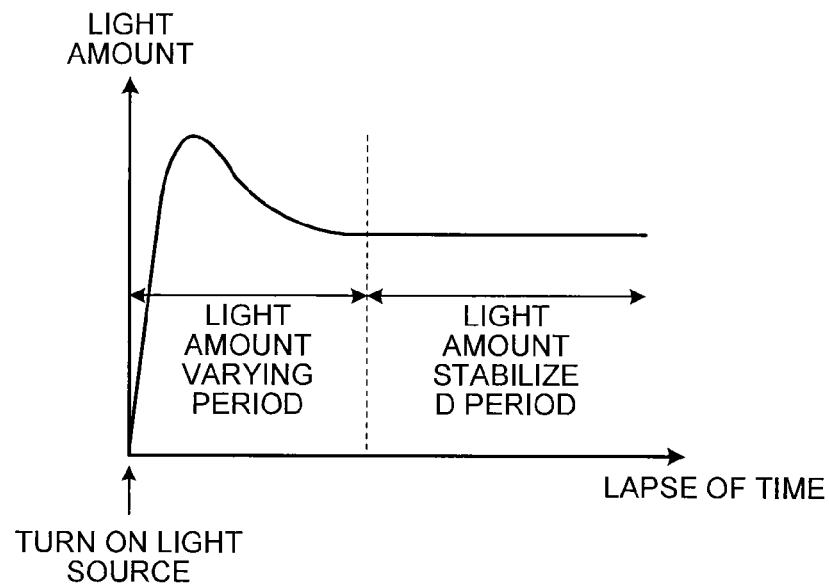
FIG. 12 is a graph illustrating an example of the initial characteristic of a light source.
Figure 13:
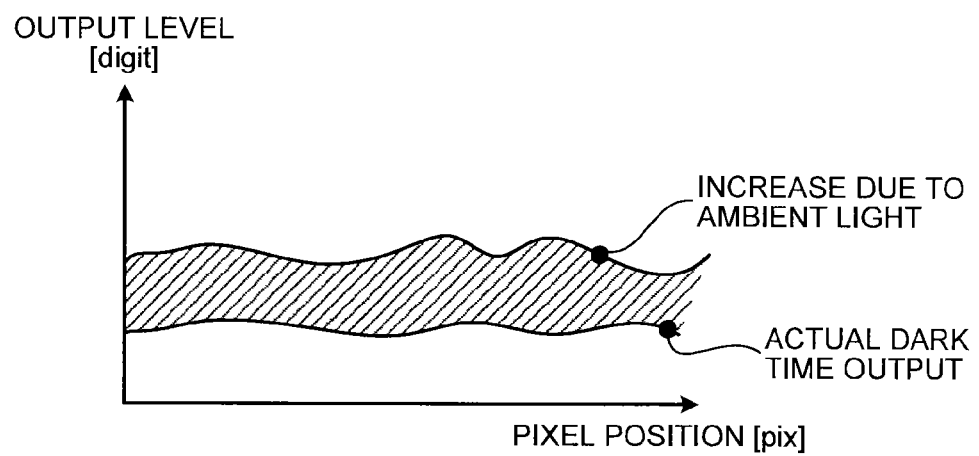
FIG. 13 is a graph illustrating an example of the increase of dark time output data due to ambient light.

As a light source for an image reading device, there has been conventionally used a xenon lamp, and recently used an LED or the like. FIG. 12 illustrates an example of the initial characteristic of the light source using a graph. FIG. 12 illustrates the amount of light from the light source (vertical axis) at an elapsed time since the light source is turned on (horizontal axis). In FIG. 12, a transition state from a light amount varying period at the time of starting the turning-on (lighting) of the light source to a light amount stabilized period is shown. It is known that the light source having the characteristic shown in FIG. 12 requires a time of several hundred ms from the start of lighting until the light amount is stabilized. Therefore, in many image reading devices, a waiting time required for stabilizing the amount of light from the light source from the start of lighting is set, and the operation is shifted to a reference white plate operation and a document read operation after the light amount has been stabilized. Such a waiting time leads to the increase of a first copy time.

Therefore, in the present embodiment, after obtaining the dark time output data, the controller 600 performs control for previously turning on the light source 204 during the return operation of the CIS 207 to the first stop position 301. Accordingly, since a waiting time required for stabilizing the light amount immediately after the light source 204 is turned on is reduced, it is possible to shorten a first copy time. As a result, the optimization of the image forming processing including the image reading can be expected.

Next, a double-sided image read operation by the CIS 135 (see FIG. 2) which is arranged inside the ADF 100 will be described. The CIS 135 installed inside the ADF 100 is an image reading unit having the same configuration as that of the CIS 207.

In FIG. 2, when reading a double-sided document, after the document discharging sensor 132 detects the leading end of a document, the position of the leading end of the document during feeding is detected according to the pulse counting of the reading motor (not shown). At the timing when the leading end of the document reaches the position of the CIS 135 of the second reading/feeding unit F, gate signals indicating an effective image area of the back surface of the document in the sub-scanning direction start being transmitted from the controller 600 to the CIS 135. The gate signals are continuously transmitted until the trailing end of the document passes through the CIS 135. Then, while the document is fed by driving the reading exit rollers 128 and the CIS exit rollers 129, an image on the back surface of the document is read by the CIS 135 in document skim reading (sheet through reading). A second reading roller 136 which is arranged so as to face the CIS 135 suppresses the floating of the document in the CIS 135, and also serves as a reference white unit for obtaining shading data in the CIS 135.

Since the CIS 135 is installed inside the ADF 100, the CIS 135 is not influenced by ambient light when generating the black correction data. Therefore, there is no difference in image quality between both of the surfaces to be read in a double-sided document. As a result, it is possible to provide high quality images on both of the surfaces. That is, by applying the same CIS 135 to both of the front and back surfaces, a difference in image quality between the front and back surfaces does not occur, and high quality images can therefore be provided.

In the above embodiment, the optical axis of the CIS 207 is arranged directly under the white reference plate fixing member. In a common flatbed image reading device, the position directly under the reference white plate 203 which is arranged between the contact glass 201 for loading a document thereon and the sheet through reading glass 202 is the least influenced by ambient light. Therefore, by obtaining and holding dark time output data while the CIS 207 is evacuated to the above position, it is possible to prevent deterioration in image quality without the increase in cost due to the addition of a special shielding member and the increase in size of the device.

When the document pressing unit is in a closed state, the CIS 207 is not influenced by ambient light. Therefore, it is possible to control the CIS 207 so as to move only when necessary by providing the pressurizing plate open/closed sensor 212 for detecting the open/closed state of the document pressing unit. As a result, it is possible to prevent the increase of a first copy time caused by an unnecessary moving operation.

When the pressurizing plate open/closed sensor 212 detects that the document pressing unit is in an open state, the CIS 207 is moved to the second stop position 302 and put on standby. That is, by previously putting the CIS 207 on standby at the position in which the dark time output data when the light source 204 is in an turned off state can be obtained, it is possible to shift the operation to the dark time output data obtaining operation immediately after receiving a read start instruction. Accordingly, it is possible to further reduce a first copy time by a time required for the CIS 207 to move to the second stop position 302.

Further, after the dark time output data obtaining operation has been completed, control for starting the turning-on (lighting) of the light source 204 of the CIS 207 is performed during a period when the CIS 207 is moved to the first stop position 301. By previously turning on the light source 204 during the moving operation of the CIS 207 to the first stop position 301, it is possible to reduce a time required for waiting for the stabilization of the amount of light from the light source 204. As a result, it is possible to reduce a first copy time by the reduction of the waiting time.

A program executed in the present embodiment is provided with previously being incorporated into the ROM 620. However, the present invention is not limited thereto. The program executed in the present embodiment may be provided as a computer program product by storing the program in a computer-readable storage medium such as a CD-ROM, flexible disk (FD), CD-R, and digital versatile disk (DVD) as an installable format file or an executable formal file.

Further, the program executed in the present embodiment may be stored on a computer that is connected to a network such as Internet, and downloaded via the network to be provided. Further, the program executed in the present embodiment may be provided or distributed via a network such as Internet.

The program executed in the present embodiment has a module configuration that includes the open/closed state obtaining unit 611, the dark time output data obtaining unit 613, and the read control unit 614. As an actual hardware, when the CPU 610 (processor) reads out the program from the storage medium and executes the program, the respective units are loaded on a main memory such as the RAM 630, and the open/closed state obtaining unit 611, the dark time output data obtaining unit 613, and the read control unit 614 are thereby generated on the main memory.

According to the embodiments, it is possible to provide an effect of preventing the deterioration in image quality even when a document pressing member is in an open state by obtaining dark time output data while the influence of ambient light is minimized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
   a light source configured to emit light to a document to be read;
   a document reading unit configured to guide the light emitted from the light source to a photoelectric conversion unit to read an image on the document;
   a driving unit configured to drive the document reading unit so that the document reading unit reciprocates along the document;
   an open/closed state obtaining unit configured to obtain an open/closed state of a document pressing unit for holding a document; and
   circuitry configured to:
     obtain a home position at which the document reading unit is in a stopped state when starting a read operation;
     obtain dark time output data of the photoelectric conversion unit while the light source is turned off; and
     perform control for causing the driving unit to return the document reading unit to the home position and entering a document read operation to read a document image after the dark time data obtaining unit obtains the dark time output data,
   wherein, when starting a read operation in a state where the open/closed state obtaining unit detects that the document pressing unit is in a closed state, the circuitry is configured to
     cause the document reading unit to stop at the home position, and
     enter the document read operation after obtaining dark time output data from the photoelectric conversion unit in a state where the light source is in a turned-off state, and
   wherein, when the open/closed state obtaining unit detects that the document pressing unit is in an open state, the circuitry is configured to cause the image reading unit to move to a position at which the dark time output data is obtained and be put on standby.

2. The image reading device according to claim 1, further comprising a white reference plate for obtaining white reference data for image data correction, wherein an optical axis of the document reading unit is located directly under the white reference plate.

3. The image reading device according to claim 1, wherein, after finishing an operation for obtaining the dark time output data, the circuitry is configured to perform control for starting turning on the light source of the image reading unit during a period when the image reading unit is moved to a stop position as the home position.

4. The image reading device according to claim 1, wherein the document pressing unit is an automatic document feeder having a document feeding function, and the document pressing unit includes
 a second document reading unit different from the document reading unit inside the automatic document feeder, and
 a simultaneous double-sided reading unit configured to read both sides of a double-sided document by feeding the double-sided document through the second document reading unit only once.

5. The image reading device according to claim 4, wherein the second document reading unit is formed from same components as the document reading unit.

6. An image forming apparatus comprising:
 the image reading device according to claim 1; and
 an image forming unit configured to perform image forming based on an image signal of the document, the image signal being output from the image reading device.

7. A document reading method performed in an image reading device that includes a light source configured to emit light to a document to be read, a document reading unit configured to guide the light emitted from the light source to a photoelectric conversion unit to read an image on the document, a driving unit configured to drive the document reading unit so that the document reading unit reciprocates along the document, and an open/closed state obtaining unit configured to obtain an open/closed state of a document pressing unit for holding a document, the document reading method comprising:
 detecting whether the document pressing unit is in an open state or a closed state using the open/closed state obtaining unit;
 obtaining a home position at which the document reading unit is in a stopped state when starting a read operation;
 obtaining dark time output data of the photoelectric conversion unit while the light source is turned off; and
 performing control for causing the driving unit to return the document reading unit to the home position and entering a document read operation to read a document image after the dark time output data is obtained,
 wherein, when starting a read operation in a state where the open/closed state obtaining unit detects that the document pressing unit is in a closed state, the method further comprises
  causing the document reading unit to stop at the home position, and
  entering the document read operation after obtaining dark time output data from the photoelectric conversion unit in a state where the light source is in a turned-off state, and
 wherein, when the open/closed state obtaining unit detects that the document pressing unit is in an open state, the method further comprises
  causing the image reading unit to move to a position at which the dark time output data is obtained and be put on standby.

8. A non-transitory computer-readable storage medium with an executable program stored thereon and executed by a computer in an image reading device that includes a light source configured to emit light to a document to be read, a document reading unit configured to guide the light emitted from the light source to a photoelectric conversion unit to read an image on the document, a driving unit configured to drive the document reading unit so that the document reading unit reciprocates along the document, and an open/closed state obtaining unit configured to obtain an open/closed state of a document pressing unit for holding a document, wherein the program instructs the computer to perform:
 detecting whether the document pressing unit is in an open state or a closed state using the open/closed state obtaining unit;
 obtaining a home position at which the document reading unit is in a stopped state when starting a read operation;
 obtaining dark time output data of the photoelectric conversion unit while the light source is turned off; and
 performing control for causing the driving unit to return the document reading unit to the home position and entering a document read operation to read a document image after the dark time output data is obtained,
 wherein, when starting a read operation in a state where the open/closed state obtaining unit detects that the document pressing unit is in a closed state, the program instructs the computer to further perform
  causing the document reading unit to stop at the home position, and
  entering the document read operation after obtaining dark time output data from the photoelectric conversion unit in a state where the light source is in a turned-off state, and
 wherein, when the open/closed state obtaining unit detects that the document pressing unit is in an open state, the program instructs the computer to further perform
  causing the image reading unit to move to a position at which the dark time output data is obtained and be put on standby.

* * * * *